United States Patent [19]
Yokota

[11] Patent Number: 5,200,775
[45] Date of Patent: Apr. 6, 1993

[54] WATERPROOF CAMERA

[75] Inventor: Hidetaka Yokota, Tokyo, Japan

[73] Assignee: Asahi Kogaku Kogyo Kabushiki Kaisha, Tokyo, Japan

[21] Appl. No.: 777,787

[22] Filed: Oct. 17, 1991

[30] Foreign Application Priority Data

Oct. 29, 1990 [JP] Japan .................. 2-112113[U]

[51] Int. Cl.⁵ .................................. G03B 17/08
[52] U.S. Cl. .................................... 354/64
[58] Field of Search ............................ 354/64

[56] References Cited
U.S. PATENT DOCUMENTS 4,931,816  6/1990  Kamo et al. ................ 354/64
5,070,348 12/1991  Hayakawa et al. .......... 354/64

*Primary Examiner*—Donald A. Griffin
*Assistant Examiner*—David M. Gray
*Attorney, Agent, or Firm*—Sandler, Greenblum & Bernstein

[57] ABSTRACT

A waterproof camera including a watertight camera body, air bleeding holes formed in the camera body to connect the inside and outside of the camera body, an air permeable and water impermeable filter attached to the air bleeding holes, and a jig guiding projection which guides a filter adhering jig adapted to attach the air permeable and water impermeable filter to the air bleeding holes.

15 Claims, 4 Drawing Sheets

WATERPROOF CAMERA

BACKGROUND OF THE INVENTION

1. Field of the Invention

The present invention relates to a waterproof camera having bleeding holes which connect the inside and outside of the camera, and having an air permeable and water impermeable filter which is mounted to the bleeding holes.

2. Description of Related Art

The assignee of the present application has proposed a waterproof camera, in which a large change in the internal volume of the camera body takes place during the zooming operation, wherein an air permeable and water impermeable filter is attached to a bleeding hole connecting the inside and the outside of the camera body. In this waterproof camera, the bleeding hole balances the internal and external pressures of the camera body so that zooming and focusing can be effected with a constant operational force even though the internal volume is varied. The air permeable and water impermeable filter, which is permeable to air but impermeable to water, is made, for example, of tetrafluoroethylene resin.

The assignee of the present application has also proposed a waterproof camera in which a plurality of separate bleeding holes are provided on a convexly curved surface portion so that little or no deformation of the air permeable and water impermeable filter occurs when the air passes therethrough, as shown in FIG. 5A. In FIG. 5A, a plurality of separate bleeding holes 37 are provided on a curved filter supporting portion 13 on the front face 12a of the camera body. A circular air permeable and water impermeable filter 36 is adhered to the filter supporting portion 13 using a circular cylindrical adhering jig 18, as shown in FIG. 5B. The filter adhering jig 18 has a circular pressing surface 19 which is to be depressed against the air permeable and water impermeable filter 36, and has a circular filter receiving recess 19a which is provided in the pressing surface 19 to receive the filter supporting portion 13 and the portion of the air permeable and water impermeable filter 36 adhered thereto.

Upon adhering the air permeable and water impermeable filter 36 onto the filter supporting portion 13, the air permeable and water impermeable filter 36 is first placed on the filter supporting portion 13 of the front face 12a which is oriented upward, and then, the filter adhering jig 18 is depressed against the air permeable and water impermeable filter 36 with the filter receiving circular recess 19a receiving the filter supporting portion 13. An adhesive is either provided on the peripheral edge on the back surface of the air permeable and water impermeable filter 36 or on the opposing front face 12a of the camera body so that the air permeable and water impermeable filter 36 can be adhered to the front face 12a in a watertight fashion.

During the adhering operation as mentioned above, however, if the filter receiving recess 19a is deviated from the corresponding filter supporting portion 13, the air permeable and water impermeable filter 36 can be scratched and damaged by the inner peripheral edge of the pressing surface 19 of the adhering jig 18. To avoid this, an operator must carefully concentrate when adhering the air permeable and water impermeable filter 36, resulting in a decreased operation efficiency.

SUMMARY OF THE INVENTION

The primary object of the present invention is to provide a waterproof camera in which the air permeable and water impermeable filter 36 can be easily attached to the bleeding holes.

To achieve the object mentioned above, according to the present invention, there is provided a waterproof camera comprising a watertight camera body, at least one air bleeding hole formed in the camera body to connect the inside and outside of the camera body, an air permeable and water impermeable filter attached to the air bleeding hole, and a jig guiding device which guides a filter adhering jig adapted to attach the air permeable and water impermeable filter to the air bleeding hole.

Preferably, the camera body is provided with a filter supporting portion which is formed by a convexly curved projection so that the air bleeding hole extends through the filter supporting portion.

Preferably, a plurality of separate air bleeding holes are provided in the filter supporting portion to extend therethrough.

The air permeable and water impermeable filter covers the curved surface of the filter supporting portion.

In a preferred embodiment, the jig guiding device is comprised of an annular guide rib.

For example, the filter adhering jig has a cylindrical body having an annular pressing surface corresponding to the filter adhering surface portion and a filter receiving recess provided within the annular pressing surface to receive the portion of the air permeable and water impermeable filter that corresponds to the air bleeding holes.

The air permeable and water impermeable filter has an adhesive on its back surface thereof which can be adhered to the filter adhering surface portion defined on the filter supporting portion.

The adhesive is provided only on the outer peripheral portion of the back surface of the air permeable and water impermeable filter.

According to another aspect of the present invention, there is provided a waterproof camera comprising air bleeding holes on which an air permeable and water impermeable filter is to be attached, and a guide rib surrounding the the air bleeding holes.

The present disclosure relates to subject matter contained in Japanese Utility Model Application No. 2-112113 (filed on Oct. 29, 1990) which is expressly incorporated herein by reference in its entirety.

BRIEF DESCRIPTION OF THE DRAWINGS

Below, a detailed explanation will be made of the present invention based on embodiments shown in the attached drawings, in which.

DETAILED DESCRIPTION OF THE PREFERRED EMBODIMENTS

Figure 1:
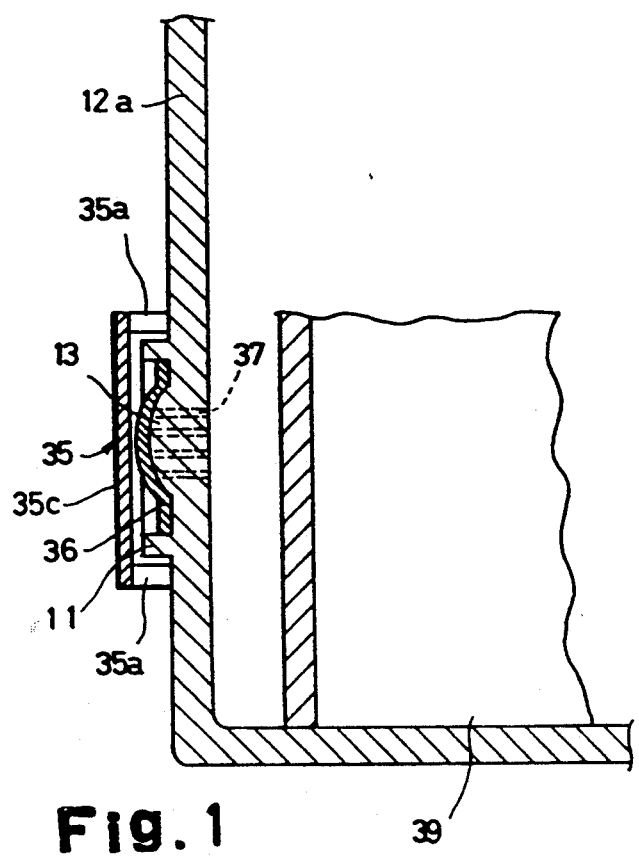
FIG. 1 is a side sectional view of a main part of a waterproof camera according to the present invention.
Figure 2:
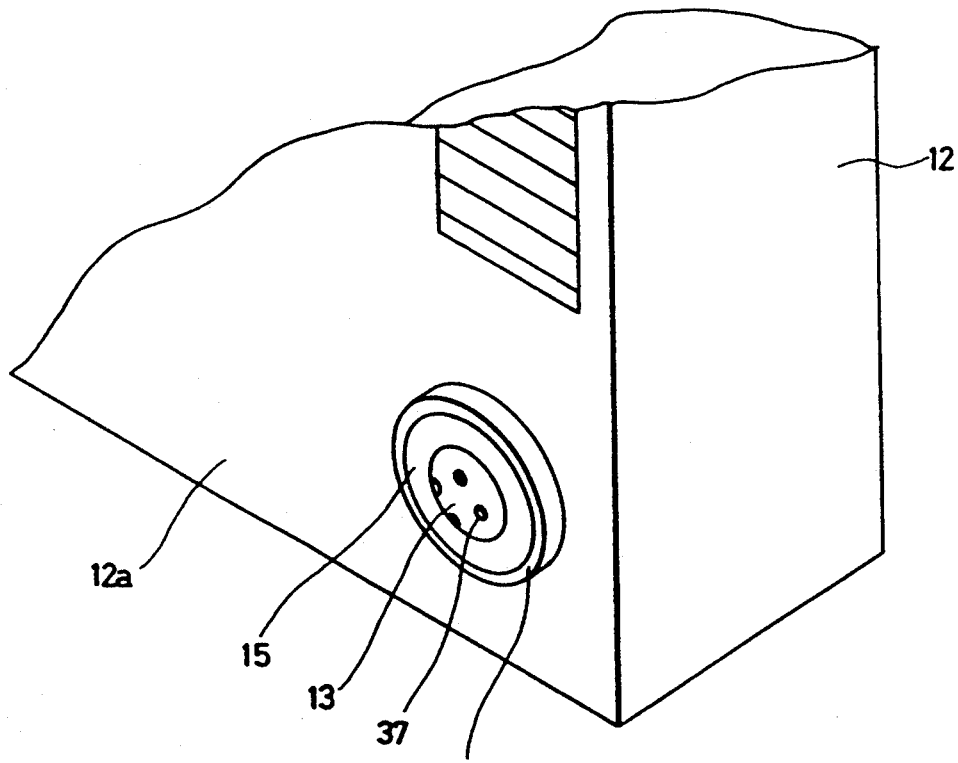
FIG. 2 is a perspective view of a main part of a waterproof camera of the present invention, with the protective cover and air permeable and water impermeable filter removed.
Figure 4:
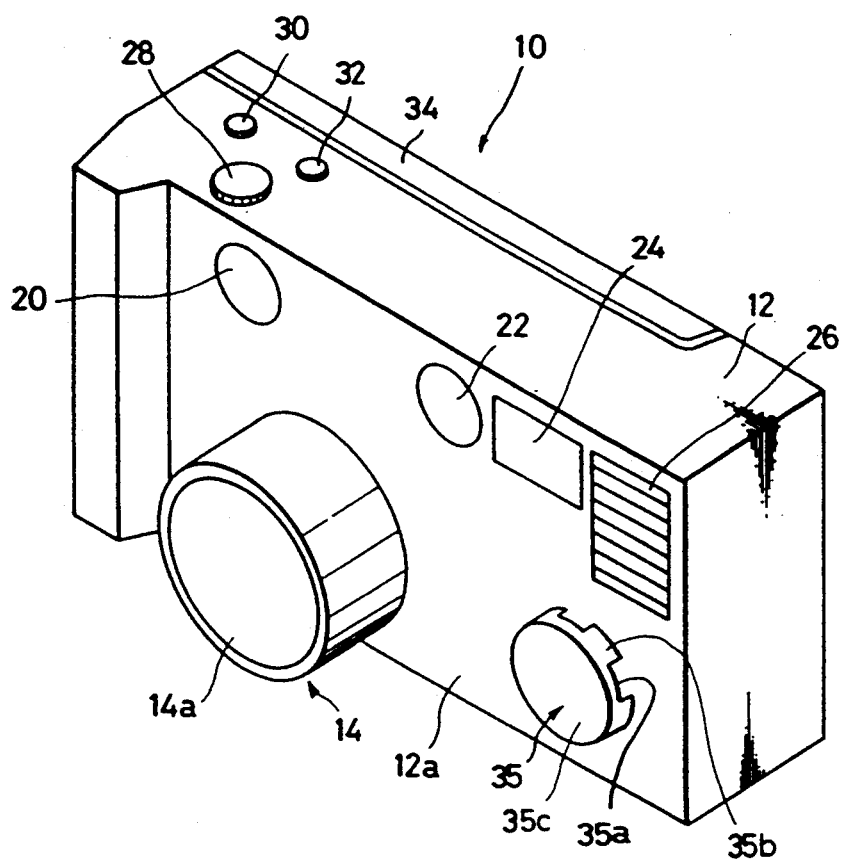
FIG. 4 is a perspective view of a waterproof camera to which the present invention is applied.

FIG. 4 shows the general appearance of a waterproof camera 10 according to the present invention. FIGS. 1 and 2 show a filter supporting portion and the surroundings thereof.

Figure 5A:
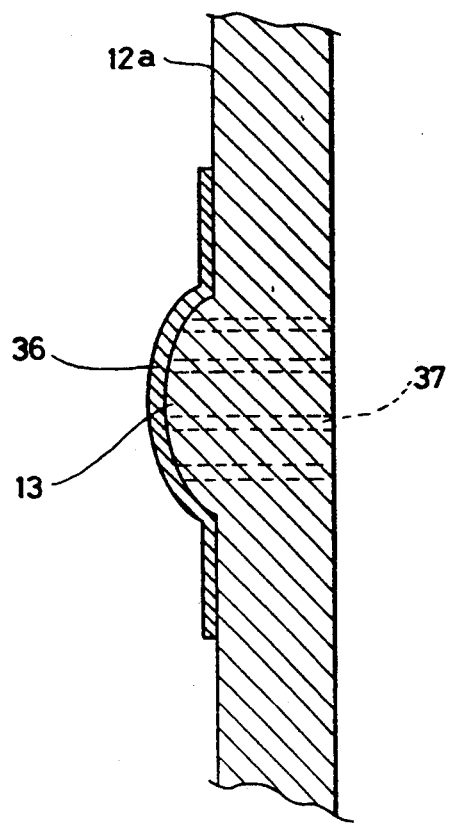
FIG. 5A is a side sectional view of a filter supporting portion and an air permeable and water impermeable filter attached thereto disclosed in a prior application proposed by the applicant of the present application.
Figure 5B:
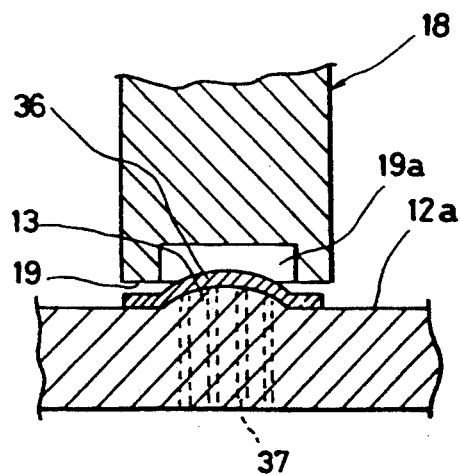
FIG. 5B is a side sectional view of a filter supporting portion and a filter securing jig which is adapted to attach an air permeable and water impermeable filter onto a filter supporting portion, as shown in FIG. 5A.

The reference numerals of the elements in FIGS. 1 through 4 correspond to those in FIGS. 5A and 5B.

The waterproof camera 10 includes a watertight camera body 12 having a movable lens barrel 14 with a watertight protective covering 14a provided on the front surface thereof. The movable lens barrel 14 can be moved in the optical axis direction thereof by a pair of zoom switches 30 and 32 which are provided on the upper surface of the camera body 12 to effect the zooming function. When zooming, the internal volume of the camera body 12 is changed due to the axial movement of the movable barrel 14.

A back cover 34 is provided on the rear surface of the camera body 12 to open and close the rear portion of the camera body. A light emitting window 20 through which infrared light is emitted to detect the distance of an object to be taken, a light receiving window 22 which receives the infrared light reflected by the object, an objective window 24 of a finder, and a strobe light emitting window 26 are provided on the front face 12a of the camera body 12. A release button 28 is provided on the upper surface of the camera body 12.

The filter supporting portion 13 is provided below the strobe light emitting window 26 as a convexly curved surface of the front face 12a of the camera body 12. A plurality of separate small bleeding holes 37, which connect the inside and the outside of the camera body to balance the internal and external pressures of the camera body, are provided in the filter supporting portion 13 (see FIG. 5A).

Figure 3:
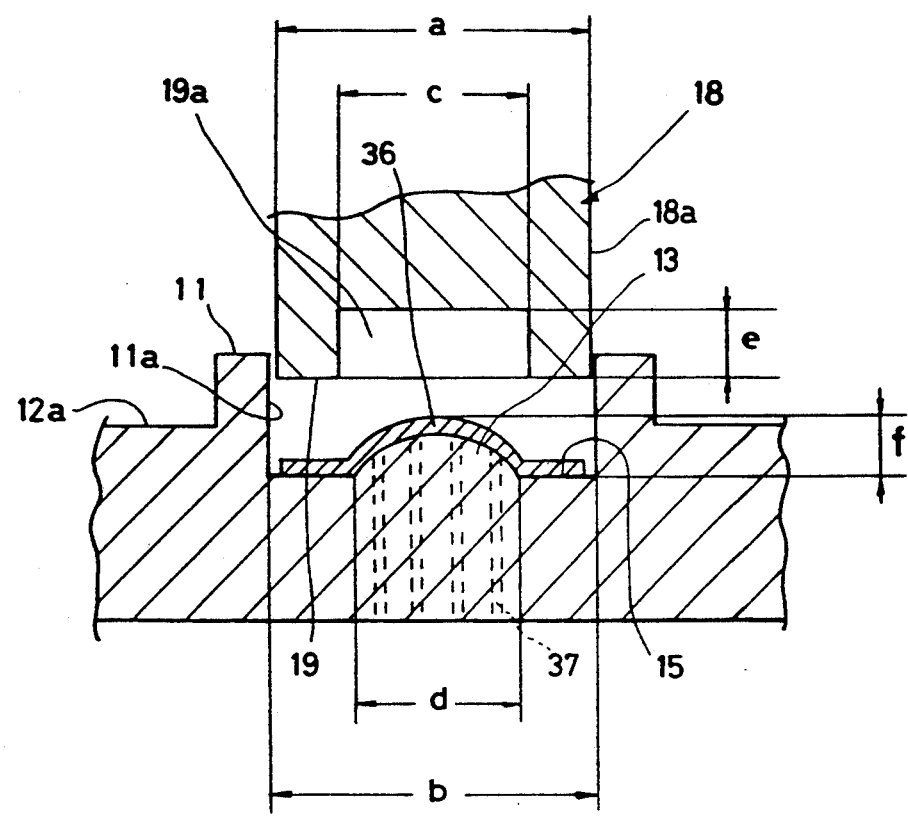
FIG. 3 is a side sectional view of a main part of a waterproof camera and a filter adhering jig which is adapted to attach an air permeable and water impermeable filter onto a filter supporting portion of a camera body.

An air permeable and water impermeable filter 36 is attached to the outer surface of the filter supporting portion 13 to cover the curved surface of the filter supporting portion 13, and accordingly covers the air bleeding holes 37. As can be seen in FIG. 3, a circular annular guide rib 11, coaxial to the circular filter supporting portion 13, has a larger diameter than the circular filter supporting portion 13 and is provided on the front wall surface 12a of the camera body 12 to surround the filter supporting portion 13. The annular guide rib 11 which projects forward from the front face 12a of the camera body 12 constitutes a jig guide means.

An adhering surface portion 15 is formed on the annular portion between the inner peripheral surface 11a of the cylindrical guide rib 11 and the outer peripheral edge of the filter supporting portion 13. The back surface of the outer peripheral edge of the air permeable and water impermeable filter 36 is adhered on the adhering surface portion 15.

On the front wall surface 12a of the camera body 12, there is provided a protective cover 35 having a plurality of legs 35b, which surround the guide rib 11, and a circular disc portion 35c, which covers the air permeable and water impermeable filter 36 attached to the filter supporting portion 13 to protect the same from being damaged, soiled or clogged. A plurality of connecting grooves 35a are formed between the legs 35b of the protective cover 35 to connect the air permeable and water impermeable filter 36 to the atmosphere. Numeral 39 (FIG. 1) designates internal camera operating components including electronic elements and an electronic circuit board, etc.

The inner diameter "b" of the guide rib 11 is slightly larger than the outer diameter "a" of the filter adhering jig 18 (b>a), as shown in FIG. 3. The inner diameter "c" of the filter receiving recess 19a of the filter adhering jig 18 is substantially equal to or slightly larger than the diameter "d" of the circular filter supporting portion 13 (c≧d). The depth "e" of the filter receiving recess 19a is slightly larger than the sum "f" of the height of the filter supporting portion 13 and the thickness of the air permeable and water impermeable filter 36 attached thereto (e>f).

In the waterproof camera 10, as constructed above, when the movable lens barrel 14 is moved in the optical axis direction relative to the camera body 12, the volume within the camera body 12 and the movable lens barrel 14 is varied, as mentioned above. Consequently, the air within the camera body 12 is displaced through the connecting grooves 35a of the protective cover 35, the air permeable and water impermeable filter 36, and the air bleeding holes 37 corresponding to the change in volume caused by the zooming operation. Accordingly, there is no change in the operational force required to move the movable lens 14 as the internal pressure of the camera body 12 and the movable lens 14 does not vary.

The following discussion will be directed to the adhering operation of the air permeable and water impermeable filter 36 to the filter supporting portion 13.

As shown in FIG. 3, the air permeable and water impermeable filter 36 which has an adhesive applied on the back surface portion thereof, not including its circular portion which corresponds to the filter supporting portion 13, is located on the adhering surface portion 15 of the waterproof camera 10. Thereafter, the filter adhering jig 18 is inserted in the annular guide rib 11 so that the outer surface 18a of the filter adhering jig 18 is fitted in the inner guide surface 11a of the guide rib 11. Consequently, the air permeable and water impermeable filter 36, which covers the convex surface of the filter supporting portion 13, is received in the filter receiving recess 19a of the filter adhering jig 18. The pressing surface 19 of the filter adhering jig 18 presses the outer peripheral edge of the air permeable and water impermeable filter 36 against the adhering surface portion 15 of the filter supporting portion 13. Thus, as the shape of the filter adhering jig 18 conforms to the annular guide rib 11, the air permeable and water impermeable filter 36 is prevented from being scratched or damaged. Accordingly, it is not necessary for an operator to excessively concentrate on the filter adhering jig 18 when adhering the air permeable and water impermeable filter 36. This decreases the burden on the operator and increases the operation efficiency.

Although the invention has been described with reference to particular means, materials, and embodiments, it is to be understood that the invention is not limited to the particulars disclosed and extends to all equivalents within the scope of the claims.

I claim:

1. A waterproof camera comprising:

a watertight camera body;

at least one air bleeding hole formed in said camera body to connect the inside and outside of said camera body;

an air permeable and water impermeable filter attached to said air bleeding hole; and a jig guiding device provided on said camera body which guides a filter adhering jig adapted to attach said air permeable and water impermeable filter to said air bleeding hole, wherein said jig guiding device comprises a guide rib, said guide rib protruding from said camera body.

2. A waterproof camera according to claim 1, wherein said camera body is provided with a filter supporting portion which is formed by a curved projection, said air bleeding hole extending through said filter supporting portion.

3. A waterproof camera according to claim 2, wherein a plurality of separate air bleeding holes are provided in said filter supporting portion to extend therethrough.

4. A waterproof camera according to claim 2, wherein said air permeable and water impermeable filter covers said curved projection of said filter supporting portion.

5. A waterproof camera according to claim 2, further comprising a protective cover which covers said filter supporting portion.

6. A waterproof camera according to claim 5, wherein said guide rib is an angular guide rib.

7. A waterproof camera according to claim 5, wherein said protective cover has a plurality of legs surrounding the guide rib, a circular disc portion opposite said filter supporting portion, and a plurality of connecting grooves defined by and between the legs.

8. A waterproof camera according to claim 3, wherein said guide rib defines therein a filter adhering surface portion.

9. A waterproof camera according to claim 8, in combination with a filter adhering jig, wherein said filter adhering jig has a cylindrical body having an annular pressing surface corresponding to said filter adhering surface portion and a filter receiving recess provided within said annular pressing surface to receive the portion of said air permeable and water impermeable filter corresponding to said air bleeding holes.

10. A waterproof camera according to claim 8, wherein said air permeable and water impermeable filter has an adhesive on a rear surface thereof which can be adhered to said filter adhering surface portion defined in said filter supporting portion.

11. A waterproof camera according to claim 10, wherein said adhesive is provided only on an outer peripheral portion of said rear surface of said air permeable and water impermeable filter.

12. A waterproof camera according to claim 11, in combination with a filter adhering jig, wherein said guide rib is an annular guide rib, and wherein said filter adhering jig has an outer diameter smaller than an inner diameter of said annular guide rib.

13. A waterproof camera comprising:

air bleeding holes on which an air permeable and water impermeable filter is to be attached;

a guide rib surrounding said air bleeding holes; and a camera body which includes a protective cover corresponding to said air bleeding holes to cover the same, said protective cover having a plurality of legs surrounding said guide rib, a circular disc portion opposed to said air bleeding holes, and a plurality of connecting grooves defined by and between the legs.

14. A waterproof camera according to claim 13, wherein said guide rib defines therein an annular filter adhering surface portion between said air bleeding holes and said guide rib.

15. A waterproof camera according to claim 14, wherein said air permeable and water impermable filter is adhered at an outer peripheral edge thereof to said annular filter adhering surface portion.

* * * * *